United States Patent
Müller

[11] Patent Number: 6,106,746
[45] Date of Patent: Aug. 22, 2000

[54] MANUFACTURE OF MOULDINGS

[75] Inventor: Beat Müller, Marly, Switzerland

[73] Assignee: Novartis AG, Basel, Switzerland

[21] Appl. No.: 09/230,248

[22] PCT Filed: Jul. 25, 1997

[86] PCT No.: PCT/EP97/04065

§ 371 Date: Jan. 22, 1999

§ 102(e) Date: Jan. 22, 1999

[87] PCT Pub. No.: WO98/04934

PCT Pub. Date: Feb. 5, 1998

[30] Foreign Application Priority Data

Jul. 26, 1996 [EP] European Pat. Off. .............. 96810500

[51] Int. Cl.⁷ ..................................................... B29D 11/00
[52] U.S. Cl. ........................ 264/1.36; 264/1.1; 264/1.38; 264/496; 264/28
[58] Field of Search ..................................... 264/1.1, 1.36, 264/1.38, 28, 494, 496

[56] References Cited

U.S. PATENT DOCUMENTS

| | | | |
|---|---|---|---|
| 3,151,095 | 9/1964 | Stone et al. ................................. | 264/28 |
| 3,171,870 | 3/1965 | Monteil et al. ............................ | 264/28 |
| 3,968,051 | 7/1976 | Stamm et al. ............................. | 264/1.1 |
| 4,673,539 | 6/1987 | Hammar et al. .......................... | 264/1.1 |
| 4,788,017 | 11/1988 | Schlomer et al. ......................... | 264/28 |
| 4,978,575 | 12/1990 | Ziess .......................................... | 264/28 |
| 5,508,317 | 4/1996 | Mueller ...................................... | 522/85 |
| 5,804,106 | 9/1998 | Yi et al. ..................................... | 264/28 |

FOREIGN PATENT DOCUMENTS

| | | | |
|---|---|---|---|
| 0 256 139 A2 | 2/1987 | European Pat. Off. . | |
| 0 218 074 A2 | 4/1987 | European Pat. Off. . | |
| 0 641 806 A2 | 8/1993 | European Pat. Off. . | |
| 64-90026 | 4/1989 | Japan ....................................... | 264/28 |

*Primary Examiner*—Mathieu D. Vargot
*Attorney, Agent, or Firm*—R. Scott Meece; Robert J. Gorman, Jr.

[57] ABSTRACT

The invention relates to a novel process for producing mouldings, especially contact lenses, which comprises the following steps: a) preparing a substantially aqueous solution of a water-soluble prepolymer that contains crosslinkable groups; b) converting the resulting solution into the solid state; c) introducing the resulting solid-state solution into a mould; d) converting the solid-state solution into the liquid state in the mould; e) where applicable closing the mould; f) initiating the crosslinking; g) where applicable opening the mould, so that the moulding can be removed from the mould.

9 Claims, No Drawings

MANUFACTURE OF MOULDINGS

The invention relates to a novel process for producing mouldings, especially contact lenses, in which a soluble prepolymer containing crosslinkable groups is crosslinked in solution, which process is distinguished from the known metering techniques by the fact that the solution of the prepolymer is metered into a mould in the solid state.

EP-A-641 806 describes a process for producing mouldings which comprises the following steps:
a) preparing a substantially aqueous solution of a water-soluble prepolymer that contains crosslinkable groups,
b) introducing the resulting solution into a mould,
c) initiating the crosslinking,
d) opening the mould, so that the moulding can be removed from the mould.

The present invention is directed towards a further development of that process in which the introduction of the solution obtained into the mould has been fundamentally improved. The improvement consists essentially in that the solution is metered into the mould in the solid state. As a result, for example, the solution can be introduced into the mould without any bubble formation. Furthermore, the formation of schlieren, which may occur with the known process, can be avoided in accordance with the invention. In addition, the appearance of drying rings, which may also be observed using the known process, can be substantially avoided in accordance with the invention. A further important advantage of the process according to the invention is that the viscosity of the prepolymer solution to be used is no longer a limiting factor for the metering, since the prepolymer solution in the solid state can be metered without any problem. To summarise, the process according to the invention, as a result of resorting to metering in the solid state, has proved extremely advantageous compared with the known process, especially where prepolymer solutions of relatively high viscosity are to be processed.

The invention accordingly relates to a process for producing mouldings, especially contact lenses, which comprises the following steps:
a) preparing a substantially aqueous solution of a water-soluble prepolymer that contains crosslinkable groups,
b) converting the resulting solution into the solid state,
c) introducing the resulting solid-state solution into a mould,
d) converting the solid-state solution into the liquid state in the mould,
e) where applicable closing the mould,
f) initiating the crosslinking,
g) where applicable opening the mould, so that the moulding can be removed from the mould.

The decisive criteria for the use of a prepolymer in the process according to the invention are that the prepolymer be soluble in water, that it contain crosslinkable groups and that it be possible for a substantially aqueous solution of the prepolymer to be reversibly converted from the liquid state to the solid state.

A substantially aqueous solution of a water-soluble prepolymer that contains crosslinkable groups can be prepared in a manner known per se, for example by synthesising the prepolymer in a substantially aqueous solution or by isolating the prepolymer, for example in pure form, that is to say free of undesirable constituents, and dissolving it in a substantially aqueous medium.

Broadly speaking, the process is carried out in an aqueous solvent. A suitable solvent is, in principle, any solvent that dissolves the prepolymer and the vinyl comonomers possibly used in addition, and is water-miscible, for example water, an alcohol, such as a lower alkanol, for example ethanol or methanol, a carboxylic acid amide, such as dimethylformamide, or dimethyl sulfoxide. An aqueous solution is to be understood as meaning water or a mixture of a suitable solvent with water, for example a mixture of water with an alcohol, such as a water/ethanol mixture or a water/methanol mixture, in which water clearly constitutes the larger portion. A substantially aqueous solution is to be understood as meaning that water makes up at least 80% by weight of the solvent, preferably at least 90% by weight, especially at least 95% by weight, more especially at least 98.5% by weight and most especially 100% by weight.

These figures relate only to solvents other than water and do not have any bearing on any possible content of prepolymer, salts or other dissolved substances.

In accordance with the invention, the criterion that the prepolymer be soluble in water is to be understood especially as meaning that the prepolymer is soluble in a substantially aqueous solution, at 20° C., in a concentration of approximately from 3 to 90% by weight, preferably of approximately from 5 to 60% by weight and especially of approximately from 10 to 60% by weight. Insofar as is possible in any individual case, prepolymer concentrations of more than 90% are also included according to the invention. Concentrations of the prepolymer in solution of from approximately 15 to approximately 50% by weight, especially from approximately 15 to approximately 40% by weight, for example from approximately 25 to approximately 40% by weight, are especially preferred.

Within the context of this invention, substantially aqueous solutions of the prepolymer include especially solutions of the prepolymer in water, in aqueous salt solutions, especially aqueous salt solutions that have an osmolarity of approximately from 200 to 450 milliosmol in 1000 ml (unit: mosm/l), preferably an osmolarity of approximately from 250 to 350 mosm/l, especially of approximately 300 mosm/l, or in mixtures of water or of aqueous salt solutions with physiologically tolerable polar organic solvents, such as glycerol. Solutions of the prepolymer in water or in aqueous salt solutions are preferred, and those in water only are especially preferred.

The aqueous salt solutions are advantageously solutions of physiologically tolerable salts, such as the buffer salts customary in the field of contact lens care, for example phosphate salts, or the isotonicising agents customary in the field of contact lens care, such as especially alkali metal halides, for example sodium chloride, or solutions of mixtures thereof. An example of an especially suitable salt solution is a synthetic, preferably buffered, lachrymal fluid that has been matched to natural lachrymal fluid in respect of pH value and osmolarity, for example an unbuffered or preferably buffered, for example phosphate buffer-buffered, sodium chloride solution the osmolarity and pH value of which correspond to the osmolarity and pH value of human lachrymal fluid.

The above-defined substantially aqueous solutions of the prepolymer are preferably pure solutions, that is to say solutions that are tree or substantially free of undesirable constituents. Especially preferred are solutions of the prepolymer in pure water or in a synthetic lachrymal fluid as described above.

The viscosity of the solution of the prepolymer in the substantially aqueous solution is, within broad limits, not critical. As has already been mentioned, contrary to the process known from the prior art it is not absolutely necessary for the solution to be free-flowing.

The average molecular weight of the prepolymer is also, within broad limits, not critical. Preferably, however, the prepolymer has a weight average molecular weight of from approximately 2,000 to approximately 200,000, especially from approximately 10,000 to approximately 200,000.

The prepolymer used in accordance with the invention must also contain crosslinkable groups. Crosslinkable groups are to be understood as meaning customary crosslinkable groups well known to the person skilled in the art, for example photocrosslinkable or thermally crosslinkable groups. Crosslinkable groups such as those that have already been proposed for the manufacture of contact lens materials are especially suitable. They include especially, but not exclusively, groups containing carbon-carbon double bonds. In order to demonstrate the wide variety of suitable crosslinkable groups there may be mentioned here as crosslinking mechanisms, purely by way of example, radical polymerisation, 2+2-cycloaddition, Diels-Alder reaction, ROMP (Ring Opening Metathesis Polymerisation), vulcanisation, cationic crosslinking and epoxy curing.

Suitable water-soluble prepolymers that contain crosslinkable groups are, for example, the polyvinyl alcohol derivatives described in EP-A-641 806. It is also possible, however, to use in this process other water-soluble prepolymers that contain a polymeric base structure as well as crosslinkable groups.

Suitable polymeric base structures apart from polyvinyl alcohol are materials such as those that have already been proposed in some cases as contact lens materials, for example polymeric diols other than PVA, polymers containing saccharides, polymers containing vinylpyrrolidone, polymers containing alkyl (meth)acrylates, polymers containing alkyl (meth)acrylates that have been substituted by hydrophilic groups, such as by hydroxy, carboxy or amino, polyalkylene glycols, or copolymers or mixtures thereof.

The prepolymer used according to the invention contains crosslinkable groups preferably in an amount of from approximately 0.5 to approximately 80% equivalents, based on the equivalents of monomers forming the polymeric base structure, especially approximately from 1 to 50%, more especially approximately from 1 to 25%, preferably approximately from 2 to 15%, and especially approximately from 3 to 10%. Special preference is given also to contents of crosslinkable groups of from approximately 0.5 to approximately 25% equivalents, especially approximately from 1 to 15% and more especially approximately from 2 to 12%, based on the equivalents of monomers forming the polymeric base structure.

Crosslinkable prepolymers provided for the manufacture of contact lenses contain especially from approximately 0.5 to approximately 25%, especially approximately from 1 to 15% and more especially approximately from 2 to 12% of those units.

As has already been mentioned, it is essential for the suitability of a prepolymer for the process according to the invention that it be crosslinkable. The prepolymer is, however, uncrosslinked, or at least substantially uncrosslinked, so that it is water-soluble.

In addition, the prepolymer is advantageously stable in the uncrosslinked state, so that it can be subjected to purification. The prepolymers are used preferably in the form of pure solutions in the process according to the invention. The prepolymers can be converted into the form of pure solutions, for example, as disclosed hereinbelow.

Preferably, the prepolymers to be used in the process according to the invention can be purified in a manner known per se, for example by precipitation with organic solvents, such as acetone, filtration and washing, extraction in a suitable solvent, dialysis or ultrafiltration, with special preference being given to ultrafiltration. By means of that purification process, it is possible to obtain the prepolymers in an extremely pure form, for example in the form of concentrated aqueous solutions that are free or at least substantially free of reaction products, such as salts, and of starting materials, for example non-polymeric constituents. Preferred degrees of purity are less than 1% of undesirable constituents, especially less than 0.1% and more especially less than 0.01% of undesirable constituents.

The degree of purity can be increased even further so that undesirable constituents, such as starting materials for the preparation of a compound containing units of formula I or III, are present in an amount of less than 0.1 ppm, or sodium chloride is present in an amount of less that 60 ppm. It should be noted here that not all substances apart from the prepolymer will automatically qualify as undesirable constituents. For example sodium chloride is, in principle, completely tolerable in a concentration of up to approximately 0.9% but is not, on the other hand, a necessary constituent. Starting materials for the preparation of the prepolymer, for example of formula I or III, however, are undesirable constituents in the context of this invention. Especially preferred degrees of purity are therefore less than 100 ppm of undesirable constituents, especially less than 1 ppm and more especially less than 0.1 ppm of undesirable constituents.

The preferred method of purifying the prepolymers to be used in the process according to the invention, i.e. ultrafiltration, can be carried out in a manner known per se. It is also possible to carry out such ultrafiltration repeatedly, for example from two to ten times. The ultrafiltration may alternatively be carried out continuously until the desired degree of purity has been achieved. The desired degree of purity may, in principle, be as high as desired. A suitable measure for the degree of purity is, for example, the sodium chloride content of the solution, which can easily be determined in known manner.

In a preferred embodiment of the process according to the invention, in step a) there is prepared and used a substantially aqueous solution of the prepolymer that is substantially free of undesirable constituents, for example free of monomeric, oligomeric or polymeric starting compounds used for the preparation of the prepolymer and/or free of secondary products formed during the preparation of the prepolymer. The substantially aqueous solution is especially a purely aqueous solution or a solution in a synthetic lachrymal fluid as described hereinbefore. It is furthermore preferred for the process according to the invention to be carried out without the addition of a comonomer, for example a vinyl comonomer.

On the basis of one of the features mentioned in the above paragraph and especially on the basis of a combination of the features mentioned in the above paragraph, the prepolymer solution used in the process according to the invention contains no or substantially no undesirable constituents that have to be extracted after crosslinking. It is therefore a special feature of this preferred embodiment of the process according to the invention that the extraction of undesirable constituents following crosslinking can be omitted.

The process according to the invention is accordingly carried out preferably in such a manner that the substantially aqueous solution of the water-soluble prepolymer containing crosslinkable groups is free or substantially free of undesirable constituents, such as, especially, monomeric, oligomeric or polymeric starting compounds used for the preparation of the prepolymer or secondary products formed during the manufacture of the prepolymer, and/or that the solution is used without the addition of a comonomer, so that it is possible to dispense with the extraction of any undesirable constituents in the further course of the process.

The photocrosslinking which then preferably follows is accordingly carried out essentially directly in the aqueous solution of the prepolymer, which can be obtained as a result of the preferred purification step, i.e. ultrafiltration, where appropriate after the addition of an additional vinyl comonomer, the solution being converted temporarily into the solid state in order to facilitate metering into the mould. It is possible, for example, for an approximately 15 to 40% aqueous solution to be photocrosslinked.

An additive that may be added to the solution of the prepolymer if appropriate is an initiator for the crosslinking, insofar as an initiator is necessary in order for the crosslinkable groups to be crosslinked. That may be the case especially when the crosslinking is effected by photocrosslinking, which is preferred in the process according to the invention.

In the case of photocrosslinking, a photoinitiator that is capable of initiating radical crosslinking is suitably added. Examples of photoinitiators are familiar to the person skilled in the art, but benzoin methyl ether, 1-hydroxycyclohexyl phenyl ketone and commercial products, such as various Irgacure types, for example Irgacure 1173 or Irgacure 2959, may be mentioned specifically as suitable photoinitiators.

The photoinitiators are added in an effective amount, advantageously in an amount of from approximately 0.1 to approximately 2.0% by weight, especially from 0.3 to 0.5% by weight, based on the total amount of the prepolymer.

The conversion into the solid state of the resulting solution, especially of a solution purified as described hereinbefore, is carried out especially by freezing the solution. It is preferable for the freezing operation to be carried out in such a manner that individual particles, referred to below as pellets, are produced. It is especially preferred for such individual particles to correspond in volume to the volume of the mould in which the moulding is crosslinked in a subsequent process step. The volume of an individual pellet may correspond to the volume of the mould, or the volume of a number of pellets, for example from 2 to 6, preferably from 2 to 4, smaller pellets corresponds to the volume of the mould. Preferably, an individual pellet corresponds to the volume of the mould that is to be filled. Irrespective of how many pellets are used to fill a mould, a certain degree of overfilling, for example by up to approximately 25%, especially up to approximately 10% or 5%, is not critical. As a result of the conversion into pellets, firstly it is unnecessary for the solution, which has been converted into the solid state, to be divided before metering and, in addition, each mould is filled relatively precisely, ideally with exactly one pellet.

In order to achieve this, the prepolymer solution may, for example, be applied in drops to a cooled plate. Preferably, the plate has been cooled in such a manner that the drops falling on it solidify immediately. Suitable temperatures for, for example, a glass plate, are in the range from –30° to –50° C., with –40° being preferred. The pellets may be removed from the plate after solidification. Immediate further processing in the process according to the invention is possible but not necessary, since the pellets can be stored below the melting point usually for any length of time.

Procedures that are known per se may be used to introduce the resulting solid-state solution, that is to say the pellets, into a mould, such as, especially, conventional metering-in, for example mechanical insertion.

The mould into which the pellets are inserted is preferably preheated so as to accelerate the thawing of the pellets. Suitable preheating temperatures are up to 60° C., especially up to 50° C., it obviously being necessary for the temperature selected to be compatible with the material from which the mould is made. Suitable preheating temperatures such as those mentioned above result in times for the conversion of the pellets into the liquid state of up to one minute, ideally up to 30 or up to 15 seconds. It is also possible for the melting energy to be supplied to the pellets in the form of microwaves or infrared radiation.

The photocrosslinking which then preferably follows is accordingly carried out essentially directly in the aqueous solution of the prepolymer, which can be obtained as a result of the preferred purification step, i.e. ultrafiltration, preferably without the addition of an additional vinyl comonomer, the solution being converted temporarily into the solid state in order to facilitate metering into the mould. In that manner it is possible, for example, for an approximately 15 to 40% aqueous solution to be photocrosslinked.

As far as the choice of the mould is concerned, the moulding, especially a contact lens, can be produced in a manner known per se, for example in a conventional "spin-casting-mold", as described, for example, in U.S. Pat. No. 3,408,429, or in accordance with the so-called full-mold method in a static mould, as described, for example, in U.S. No. 4,347,198. Appropriate moulds are produced, for example, from polypropylene. Suitable materials for reusable moulds are, for example, quartz, sapphire glass and metals.

Depending on the nature of the moulding and of the mould or arrangement of mould parts used, it may or may not be necessary for the mould to be closed. Accordingly, in the process according to the invention the mould is closed where appropriate and, after the crosslinking has been initiated, is opened again. The person skilled in the art will readily recognise where that is necessary. The two steps of closing and opening are necessary, for example, in the typical full-mold process whereas if, for example, the procedure according to EP-A-637 490 is followed, complete closure of the mould is unnecessary. In that case too, however, the external shape of the moulding is essentially determined by the mould or the mould parts.

The crosslinking can be initiated in the mould, for example by actinic radiation, for example by UV light, or ionising radiation, for example gamma radiation, electron radiation or X-rays. The crosslinking can, where appropriate, also be thermally initiated. It should be emphasised that the crosslinking can be effected in a very short time, for example in less than five minutes, preferably in less than one minute, especially in up to 30 seconds, more especially as described in the Examples.

The polymers that can be obtained by photocrosslinking a suitable prepolymer in the absence or presence of an additional vinyl comonomer are water-insoluble.

The opening of the mould, so that the moulding can be removed from the mould, can be carried out in a manner known per se. Whereas in processes proposed in the prior art it is usually necessary for removal from the mould to be followed by purification steps, for example by extraction, and steps for hydrating the resulting mouldings, especially contact lenses, such steps are not necessary in the process according to the invention.

Since the prepolymer solution preferably contains no undesirable low-molecular-weight constituents, the crosslinked product also contains no such constituents. Consequently, subsequent extraction is not required. Since the crosslinking is carried out in a substantially aqueous solution, subsequent hydration is not necessary. The result of those two features is, inter alia, that laborious after-treatment of the resulting mouldings, especially contact lenses, is unnecessary.

As has been mentioned already, a prepolymer especially suitable for use in the process according to the invention is a derivative of a polyvinyl alcohol having a weight average molecular weight of at least approximately 2000 that contains from approximately 0.5 to approximately 80%, based on the number of hydroxy groups in the polyvinyl alcohol, of units of formula I

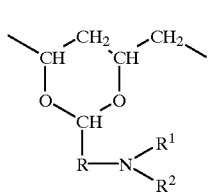
(I)

wherein R is lower alkylene having up to 8 carbon atoms, $R^1$ is hydrogen or lower alkyl and $R^2$ is an olefinically unsaturated, electron-attracting, copolymerisable radical having preferably up to 25 carbon atoms.

$R^2$ is, for example, an olefinically unsaturated acyl radical of the formula $R^3$—CO— wherein $R^3$ is an olefinically unsaturated copolymerisable radical having from 2 to 24 carbon atoms, preferably from 2 to 8 carbon atoms, especially from 2 to 4 carbon atoms. In another embodiment, the radical $R^2$ is a radical of formula III

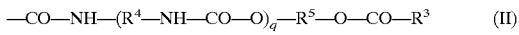
—CO—NH—(R⁴—NH—CO—O)$_q$—R⁵—O—CO—R³ (II)

wherein q is zero or one and $R^4$ and $R^5$ are each independently of the other lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms or arylenealkylenearylene having from 13 to 16 carbon atoms, and wherein $R^3$ is as defined above.

The prepolymer is therefore especially a derivative of a polyvinyl alcohol having a weight average molecular weight of at least approximately 2000 that contains from approximately 0.5 to approximately 80%, based on the number of hydroxy groups in the polyvinyl alcohol, of units of formula III

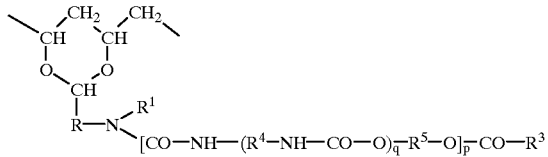
(III)

wherein R is lower alkylene, $R^1$ is hydrogen or lower alkyl, p is zero or one, q is zero or 1, $R^3$ is an olefinically unsaturated copolymerisable radical having from 2 to 8 carbon atoms and $R^4$ and $R^5$ are each independently of the other lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms or arylenealkylenearylene having from 13 to 16 carbon atoms.

Lower alkylene R has preferably up to 8 carbon atoms and may be straight-chain or branched. Suitable examples include octylene, hexylene, pentylene, butylene, propylene, ethylene, methylene, 2-propylene, 2-butylene and 3-pentylene. Preferably, lower alkylene R has up to 6 and especially up to 4 carbon atoms. The meanings methylene and butylene are especially preferred.

$R^1$ is preferably hydrogen or lower alkyl having up to 7, especially up to 4, carbon atoms, especially hydrogen.

Lower alkylene $R^4$ or $R^5$ has preferably from 2 to 6 carbon atoms and is especially straight-chain. Suitable examples include propylene, butylene, hexylene, dimethylethylene and, especially, ethylene.

Arylene $R^4$ or $R^5$ is preferably phenylene that is unsubstituted or substituted by lower alkyl or by lower alkoxy, especially 1,3-phenylene or 1,4-phenylene or methyl-1,4-phenylene.

A saturated divalent cycloaliphatic group $R^4$ or $R^5$ is preferably cyclohexylene or cyclohexylene-lower alkylene, e.g. cyclohexylenemethylene, that is unsubstituted or substituted by one or more methyl groups, for example trimethylcyclohexylene-methylene, e.g. the divalent isophorone radical.

The arylene moiety of alkylenearylene or arylenealkylene $R^4$ or $R^5$ is preferably phenylene unsubstituted or substituted by lower alkyl or by lower alkoxy, and the alkylene moiety is preferably lower alkylene, such as methylene or ethylene, especially methylene. Preferably, such radicals $R^4$ and $R^5$ are therefore phenylenemethylene or methylenephenylene.

Arylenealkylenearylene $R^4$ or $R^5$ is preferably phenylene-lower alkylene-phenylene having up to 4 carbon atoms in the alkylene moiety, e.g. phenyleneethylenephenylene.

The radicals $R^4$ and $R^5$ each represent, independently of the other, preferably lower alkylene having from 2 to 6 carbon atoms, phenylene unsubstituted or substituted by lower alkyl, cyclohexylene or cyclohexylene-lower alkylene unsubstituted or substituted by lower alkyl, phenylene-lower alkylene, lower alkylene-phenylene or phenylene-lower alkylene-phenylene.

In the context of this invention, the term "lower" in connection with radicals and compounds denotes, unless defined otherwise, radicals or compounds having up to 7 carbon atoms, preferably up to 4 carbon atoms.

Lower alkyl has especially up to 7 carbon atoms, preferably up to 4 carbon atoms, and is, for example, methyl, ethyl, propyl, butyl or tert-butyl.

Lower alkoxy has especially up to 7 carbon atoms, preferably up to 4 carbon atoms, and is, for example, methoxy, ethoxy, propoxy, butoxy or tert-butoxy.

The olefinically unsaturated copolymerisable radical $R^3$ having from 2 to 24 carbon atoms is preferably alkenyl having from 2 to 24 carbon atoms, especially alkenyl having from 2 to 8 carbon atoms and more especially alkenyl having from 2 to 4 carbon atoms, for example ethenyl, 2-propenyl, 3-propenyl, 2-butenyl, hexenyl, octenyl or dodecenyl. The meanings ethenyl and 2-propenyl are preferred, so that the group —CO—$R^3$ represents the acyl radical of acrylic or methacrylic acid.

The divalent group —$R^4$—NH—CO—O— is present when q is one and absent when q is zero. Prepolymers in which q is zero are preferred.

The divalent group —CO—NH—($R^4$NH—CO—O)$_q$—$R^5$—O— is present when p is one and absent when p is zero. Prepolymers in which p is zero are preferred.

In prepolymers in which p is one the index q is preferably zero. Special preference is given to prepolymers in which p is one, the index q is zero and $R^5$ is lower alkylene.

A preferred suitable prepolymer is therefore especially a derivative of a polyvinyl alcohol having a weight average molecular weight of at least approximately 2000 that contains from approximately 0.5 to approximately 80%, based on the number of hydroxy groups in the polyvinyl alcohol, of units of formula III wherein R is lower alkylene having up to 6 carbon atoms, p is zero and $R^3$ is alkenyl having from 2 to 8 carbon atoms.

A further preferred suitable prepolymer is therefore especially a derivative of a polyvinyl alcohol having a weight average molecular weight of at least approximately 2000 that contains from approximately 0.5 to approximately 80%, based on the number of hydroxy groups in the polyvinyl alcohol, of units of formula III wherein R is lower alkylene having up to 6 carbon atoms, p is one, q is zero, $R^5$ is lower alkylene having from 2 to 6 carbon atoms and $R^3$ is alkenyl having from 2 to 8 carbon atoms.

A further preferred suitable prepolymer is therefore especially a derivative of a polyvinyl alcohol having a weight average molecular weight of at least approximately 2000 that contains from approximately 0.5 to approximately 80%, based on the number of hydroxy groups in the polyvinyl alcohol, of units of formula III wherein R is lower alkylene having up to 6 carbon atoms, p is one, q is one, $R^4$ is lower alkylene having from 2 to 6 carbon atoms, phenylene unsubstituted or substituted by lower alkyl cyclohexylene or cyclohexylene-lower alkylene unsubstituted or substituted by lower alkyl, phenylene-lower alkylene, lower alkylene-phenylene or phenylene-lower alkylene-phenylene, $R^5$ is lower alkylene having from 2 to 6 carbon atoms and $R^3$ is alkenyl having from 2 to 8 carbon atoms.

Outstandingly suitable prepolymers are preferably derivatives of polyvinyl alcohol having a weight average molecular weight of at least approximately 2000 that contain from approximately 0.5 to approximately 80%, based on the number of hydroxy groups in the polyvinyl alcohol, of units of formula III, especially approximately from 1 to 50%, more especially approximately from 1 to 25%, preferably approximately from 2 to 15% and more preferably approximately from 3 to 10%. Prepolymers that are intended for the manufacture of contact lenses contain especially from approximately 0.5 to approximately 25%, based on the number of hydroxy groups in the polyvinyl alcohol, of units of formula III, especially approximately from 1 to 15% and more especially approximately from 2 to 12%.

Polyvinyl alcohols that can be derivatised to form suitable prepolymers preferably have a weight average molecular weight of at least 10,000. As an upper limit, the polyvinyl alcohols may have a molecular weight of up to 1,000,000. Preferably, the polyvinyl alcohols have a weight average molecular weight of up to 300,000, especially up to approximately 100,000 and more especially up to approximately 50,000.

Usually, suitable polyvinyl alcohols have mainly a poly (2-hydroxy)ethylene structure. The derivatised polyvinyl alcohols may, however, also have hydroxy groups in the form of 1,2-glycols, such as copolymer units of 1,2-dihydroxy-ethylene, as may be obtained, for example, by alkaline hydrolysis of vinyl acetate/vinylene carbonate copolymers.

In addition, the derivatised polyvinyl alcohols may also contain small amounts, for example up to 20%, preferably up to 5%, of copolymer units of ethylene, propylene, acrylamide. methacrylamide, dimethacrylamide, hydroxyethyl methacrylate, methyl methacrylate, methyl acrylate, ethyl acrylate, vinylpyrrolidone, hydroxy-ethyl acrylate, allyl alcohol, styrene or similar comonomers that are customarily used.

Commercially available polyvinyl alcohols may be used, such as, for example, Vinol® 107 from Air Products (MW= 22,000 to 31,000, 98–98.8% hydrolysed), Polysciences 4397 (MW=25,000, 98.5% hydrolysed), BF 14 from Chan Chun, Elvanol® 90-50 from DuPont, UF-120 from Unitika, Moviol® 3-83, 4-88, 10-98 and 20-98 from Hoechst. Other manufacturers are, for example, Nippon Gohsei (Gohsenol®), Monsanto (Gelvatol®), Wacker (Polyviol®) and the Japanese manufacturers Kuraray, Denki and Shin-Etsu.

As has already been mentioned, it is also possible to use copolymers of hydrolysed vinyl acetate, which are obtainable, for example, as hydrolysed ethylene-vinyl acetate (EVA), or vinyl chloride/vinyl acetate, N-vinylpyrrolidone/vinyl acetate and maleic acid anhydride/vinyl acetate.

Polyvinyl alcohol is usually prepared by hydrolysis of the corresponding homopolymeric polyvinyl acetate. In a preferred embodiment, the derivatised polyvinyl alcohol contains less than 50% polyvinyl acetate units, especially less than 20% polyvinyl acetate units. The polyvinyl alcohol derivatised in accordance with the invention contains residual acetate units preferably in amounts of approximately from 3 to 20%, preferably approximately from 5 to 16 % and especially approximately from 10 to 14%, based on the sum of vinyl alcohol units and acetate units.

The compounds containing units of formula I or III may be prepared in a manner known per se; see EP-A-641 806.

The vinyl comonomer that may, in accordance with the invention, be used in addition in the photocrosslinking may be hydrophilic or hydrophobic or may be a mixture of a hydrophobic and a hydrophilic vinyl monomer. Suitable vinyl monomers include especially those customarily used in the manufacture of contact lenses. A hydrophilic vinyl monomer is to be understood as meaning a monomer that as a homopolymer typically yields a polymer that is water-soluble or is capable of absorbing at least 10% by weight of water. Analogously, a hydrophobic vinyl monomer is to be under stood as meaning a monomer that as a homopolymer typically yields a polymer that is water-insoluble and is capable of absorbing less than 10% by weight of water.

Generally, approximately from 0.01 to 80 units of a typical vinyl comonomer react per unit of crosslinkable group of the prepolymer, that is to say, for example, per unit of formula I or III.

If a vinyl comonomer is used, the crosslinked polymers according to the invention contain preferably approximately from 1 to 15%, especially approximately from 3 to 8%, of crosslinkable groups based on the equivalents of monomers forming the polymeric base structure, that is to say, for example, units of formula I or III, based on the number of hydroxy groups in the polyvinyl alcohol, which are reacted with approximately from 0.1 to 80 units of the vinyl monomer.

The amount of vinyl comonomers, if they are used, is preferably from 0.5 to 80 units per crosslinkable group, especially from 1 to 30 units of vinyl comonomer per crosslinkable group and more especially from 5 to 20 units per crosslinkable group.

Preference is given also to the use of a hydrophobic vinyl comonomer or a mixture of a hydrophobic vinyl comonomer with a hydrophilic vinyl comonomer, the mixture containing at least 50% by weight of a hydrophobic vinyl comonomer. In that manner the mechanical properties of the polymer can be improved without a substantial fall in the water content. In principle, however, both conventional hydrophobic vinyl comonomers and conventional hydrophilic vinyl comonomers are suitable for copolymerisation with a prepolymer, for example polyvinyl alcohol containing groups of formula I.

Suitable hydrophobic vinyl comonomers include, without this list being definitive, $C_1$–$C_{18}$alkyl acrylates and methacrylates, $C_3$–$C_{18}$alkyl acrylamides and methacrylamides, acrylonitrile, methacrylonitrile, vinyl-$C_1$–$C_{18}$alkanoates, $C_2$–$C_{18}$-alkenes, $C_2$–$C_{18}$haloalkenes, styrene, $C_1$–$C_6$alkylstyrene, vinyl alkyl ethers in which the alkyl moiety has from 1 to 6 carbon atoms, $C_2$–$C_{10}$perfluoroalkyl acrylates and methacrylates or corresponding partially fluorinated acrylates and methacrylates, $C_3$–$C_{12}$perfluoroalkylethylthiocarbonylaminoethyl acrylates and methacrylates, acryloxy- and methacryloxy-alkylsiloxanes, N-vinylcarbazole, and $C_1$–$C_{12}$alkyl esters of maleic acid, fumaric acid, itaconic acid, mesaconic acid and the like. Preference is given, for example, to $C_1$–$C_4$alkyl esters of vinylically unsaturated carboxylic acids having from 3 to 5 carbon atoms and to vinyl esters of carboxylic acids having up to 5 carbon atoms.

Examples of suitable hydrophobic vinyl comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris-trimethylsilyloxy-silyl-propyl methacrylate, 3-methacryloxypropylpentamethyl disiloxane and bis(methacryloxy-propyl)tetramethyl disiloxane.

Suitable hydrophilic vinyl comonomers include, without this list being definitive, hydroxy-substituted lower alkyl acrylates and methacrylates, acrylamide, methacrylamide, lower alkyl acrylamides and methacrylamides, ethoxylated acrylates and methacrylates, hydroxy-substituted lower alkyl acrylamides and methacrylamides, hydroxy-substituted lower alkyl vinyl ethers, sodium ethylenesulfonate, sodium styrenesulfonate, 2-acrylamido-2-methylpropane-sulfonic acid, N-vinylpyrrole, N-vinylsuccinimide, N-vinylpyrrolidone, 2- or 4-vinylpyridine, acrylic acid, methacrylic acid, amino- (the term "amino" also including quaternary ammonium), mono-lower alkylamino- or di-lower alkylamino-lower alkyl acrylates and methacrylates, allyl alcohol and the like. Preference is given, for example, to hydroxy-substituted $C_2$–$C_4$alkyl (meth)acrylates, five- to seven-membered N-vinyl lactams, N,N-di-$C_1$–$C_4$alkyl (meth)acrylamides and vinylically unsaturated carboxylic acids having a total of from 3 to 5 carbon atoms.

Examples of suitable hydrophilic vinyl comonomers include hydroxyethyl methacrylate, hydroxyethyl acrylate, acrylamide, methacrylamide, dimethyl acrylamide, allyl alcohol, vinylpyridine, vinylpyrrolidone, glycerol methacrylate, N-(1,1-dimethyl-3-oxobutyl)acrylamide, and the like.

Preferred hydrophobic vinyl comonomers are methyl methacrylate and vinyl acetate.

Preferred hydrophilic vinyl comonomers are 2-hydroxyethyl methacrylate, N-vinylpyrrolidone and acrylamide.

The process according to the invention yields mouldings, especially contact lenses, for example by carrying out the photocrosslinking of the prepolymers in a suitable contact lens mould. Further examples of mouldings that can be produced in accordance with the invention, in addition to contact lenses, are biomedical and, especially, ophthalmic mouldings, for example intraocular lenses and eye dressings, mouldings for use in surgery, such as heart valves, artificial arteries or the like, and also films or membranes, for example membranes for controlling diffusion, photostructurable foils for information storage, or photoresist materials, for example membranes or mouldings for etching resist or screen printing resist.

In the following Examples, unless indicated to the contrary, amounts are given in amounts by weight and temperatures are given in degrees Celsius. Molecular weights within the context of this invention, unless indicated to the contrary, relate to the average molecular weight. The Examples are not intended to limit the invention in any way, for example to the scope of the Examples.

EXAMPLE 1

In a double-walled reactor fitted with a condenser, thermometer, stirrer and thermostat, under air 100 g (1.822 mol) of polyvinyl alcohol Mowiol (3-83) from Hoechst (Lot 23029, acetate content: 18.8 mol % corresponding to 3.633 meq/g, PVA content: 95.09%, inherent viscosity: 0.272 (dl/g)) are added at room temperature to 493 g of water and the mixture is heated to 90° C. with stirring. After one hour, the solution is cooled to 25° C. and 7.09 g (44.5 mmol) of N-(2,2-dimethoxyethylacrylamide) and 66.6 g of fuming hydrochloric acid (37%) are added. The mixture is stirred at 25° C. for 11.5 hours.

In order to isolate the product, the reaction mixture is adjusted to pH 7 with 236 g of 15% NaOH, filtered over a 0.45 micrometer filter and subjected to ultrafiltration under air over a 1 KD ultrafiltration membrane (Prep/scale-TFF Cartridge) from Millipor until the sodium chloride content of the permeate is less than 0.005%. The solution is isolated, yielding 465.1 g of polymer solution having a polymer content of 19.2% (corresponding to a yield of 98.7% of the theory). The solution is then concentrated to 30% using a rotary evaporator and sensitised with 0.1% (based on the dry content) Irgacure® 2959. For the manufacture of larger amounts the polymer solution is concentrated to 30% strength directly, by ultrafiltration with 1 KD tripple scree Pellikon cassettes from Millipor, and then sterile-filtered.

The data for the resulting prepolymer are as follows:

| | |
|---|---|
| inherent viscosity: | 0.309 (dl/g) |
| acetate content: | 1.51 meq/g, corresponding to 7.47 mol % |
| crosslinker (acrylamide): | 0.678% N, corresponding to 0.484 meq/g |
| viscosity of the 30% solution | 880 mPa.s (40° C.) |

EXAMPLE 2

Drops of the 30% solution obtained in accordance with Example 1 are applied to a cold glass plate using a syringe. The glass plate has been cooled to −40° C. so that the drops immediately solidify. The solidified drops, that is to say the pellets formed, are removed from the glass plate and can be stored, for as long as desired, below the softening point, which in this specific case is approximately −3° C. The pellets weigh from 30 to 40 mg.

A pellet is metered into a female contact lens mould that has been preheated to 50° C. The frozen sol, that is to say the pellet, melts within 10 seconds and the mould can be closed. After irradiation for 12 seconds with light that has been directed through a 304 nm filter at a lamp output of 101 mW/cm², the mould is opened and the contact lens can be removed. The finished contact lens has a water content of approximately 70%. The elongation at tear is 134%, the Young's modulus 0.53 mPa. The contact lens meets all the requirements for an optically precise, biocompatible and comfortable, and furthermore mechanically stable, contact lens.

The above Example demonstrates, as already mentioned at the outset, some of the surprising advantages of the process according to the invention. For example, metering bubbles, caused by a drop breaking off, do not occur. In addition, there are no evaporation rings since, as a result of the melting of the frozen sol, the mould becomes increasingly full and there is no evaporation at the periphery. Furthermore, the duration of the crosslinking reaction is favourably influenced by the elevated temperature. The duration of the melting process can be controlled by the temperature of the mould.

What is claimed is:

1. A process for producing a biomedical moulding which comprises the following steps:
   a) preparing a substantially aqueous solution of a water-soluble prepolymer that contains crosslinkable groups,
   b) converting the resulting solution into the solid state by freezing the solution,
   c) introducing the resulting solid-state solution into a mould,
   d) converting the solid-state solution into the liquid state in th mould by melting the solid-state solution,
   e) where applicable closing the mould,
   f) initiating the crosslinking,
   g) where applicable opening the mould, so that the biomedical moulding can be removed from the mould.

2. A process according to claim 1, wherein the biomedical moulding is a contact lens.

3. A process according to claim 1, wherein the substantially aqueous solution of the water-soluble prepolymer containing crosslinkable groups is free or substantially free of monomeric, oligomeric or polymeric starting compounds used for the preparation of the prepolymer or secondary products formed during the manufacture of the prepolymer.

4. A process according to claim 1, wherein the substantially aqueous solution of the water-soluble prepolymer containing crosslinkable groups is used without the addition of a vinyl comonomer.

5. A process according to claim 1, wherein an initiator for the crosslinking is added to the prepolymer solution.

6. A process according to claim 1, which comprises the following steps:
   a) preparing a substantially aqueous solution of a water-soluble prepolymer containing crosslinkable groups that is free or substantially free of monomeric, oligomeric or polymeric starting compounds used for the preparation of the prepolymer or secondary products formed during the manufacture of the prepolymer,
   b) converting the resulting solution into the solid state by freezing the solution,
   c) introducing the resulting solid-state solution into a mould,
   d) converting the solid-state solution into the liquid state in the mould by melting the solid-state solution,
   e) where applicable closing the mould,
   f) initiating the crosslinking,
   g) where applicable opening the mould, so that the biomedical moulding can be removed from the mould.

7. A process according to claim 6, wherein the biomedical moulding is a contact lens.

8. A process for producing a contact lens according to claim 7, wherein the substantially aqueous solution is a purely aqueous solution or a solution in a synthetic lachrymal fluid.

9. A process for producing a contact lens according to claim 7, wherein a crosslinking initiator is added to the solution and the crosslinking is effected by photocrosslinking.

* * * * *